Figure 1:
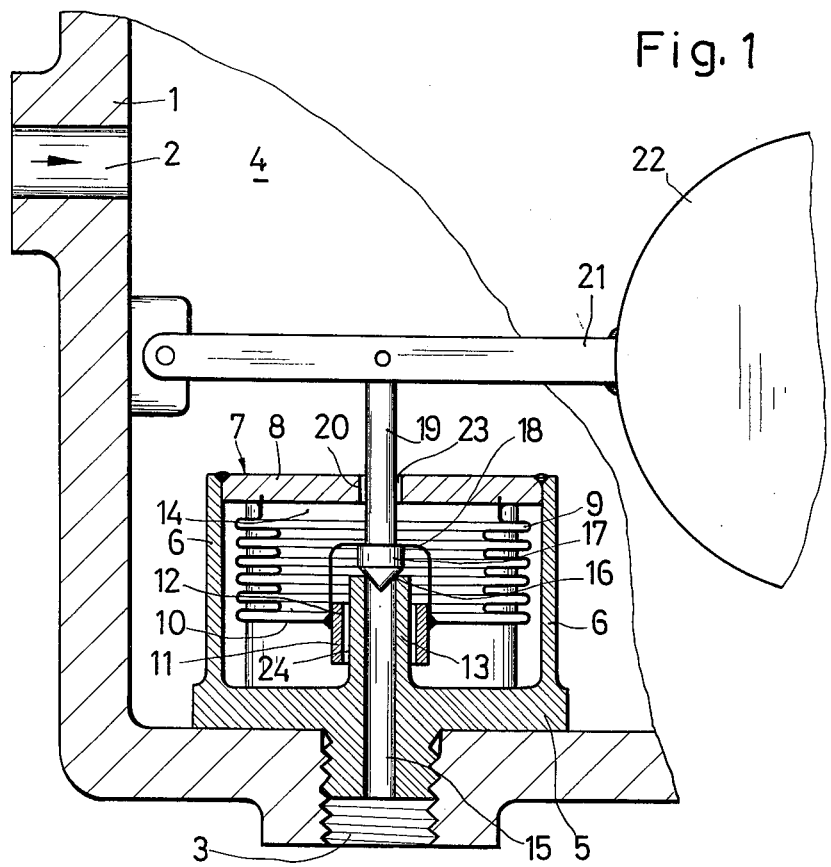

United States Patent [19]

Föller

[11] 4,030,516

[45] * June 21, 1977

[54] FLOAT CONTROLLABLE VALVE

[75] Inventor: Werner Föller, Stuhr, Heiligenrode, Germany

[73] Assignee: Gestra-KSB Vertriebsgesellschaft mbH & Co. Bremen, Bremen, Germany

[ * ] Notice: The portion of the term of this patent subsequent to Sept. 23, 1992, has been disclaimed.

[22] Filed: Jan. 22, 1976

[21] Appl. No.: 651,657

[30] Foreign Application Priority Data

Jan. 28, 1975 Germany .......................... 2503302

[52] U.S. Cl. ............................... 137/192; 137/436; 137/399
[51] Int. Cl.² ........................................... F17T 1/20
[58] Field of Search ............ 137/192, 202, 399, 436

[56] References Cited

UNITED STATES PATENTS

| 2,976,885 | 3/1961 | Garraway | 137/510 X |
| 3,906,985 | 9/1975 | Foller | 137/192 |

*Primary Examiner*—Alan Cohan
*Attorney, Agent, or Firm*—Allison C. Collard

[57] ABSTRACT

A float controllable valve responsive to the level of condensate having a housing with an internal chamber including an input supply opening and a discharge opening. There is a membrane capsule disposed in the interior of the housing and formed with at least a first throttle inlet bore communicative to the interior of the membrane capsule with the internal chamber of said housing at a pressure side. The membrane capsule includes a rigid inlet nozzle extending into the interior of the membrane capsule and has a nozzle bore communicating with the discharge channel. The inlet nozzle has a valve seat in the interior of the membrane capsule between the throttle bore and the nozzle bore. A locking member is slidably disposed and extends into the interior of the membrane capsule and has one end in sealing contact with the valve seat. There is a pivotable lever arm having a float secured at one end and disposed outside of the membrane capsule and having its opposite end pivotably coupled to the housing, said lever arm being pivotably coupled to the opposite end of the locking member. A movable wall portion is formed with a second throttle bore through which said rigid inlet nozzle extends, the wall portion being longitudinal movable with respect to the nozzle and connected to the locking member, so that when the fluid contacts the float and lifts the locking member from the valve seat, a pressure differential is created on both sides of the movable wall portion so that an additional opening force is exerted on said locking element which opens the valve rapidly.

6 Claims, 2 Drawing Figures

FLOAT CONTROLLABLE VALVE

The present invention relates to a float controlled valve.

More specifically, this invention relates to a float controlled valve having a simple structure so that relatively small tolerances may be avoided when the valve is made while assuring a good functioning capability of the valve. In the inventive valve, the closing element which runs into the outlet opening is positioned within the membrane capsule. Therefore, the medium flows through the membrane capsule when the medium is at a rest position. Thus, as long as the locking element is in a locked position, the complete pressure prevails within and outside of the membrane capsule. The stroke moveable wall portion which is connected with the locking element is at this point, free of any pressure, or more precisely, fed by the same pressure on both sides. When the locking element is somewhat lifted by the floating element, so that the medium starts to flow, the pressure in the membrane capsule decreases below the pressure in the valve housing, due to the throttle effect imposed on the medium within the inlet openings of the membrane capsule. Thus, the wall portion is not evenly fed by pressure, but a force is created which is in the direction of the valve opening. This force of the wall portion has an additional effect on the locking element aside from the force of the float, so that the locking element opens rapidly into its opening position. The throttle openings may consist, for example, as separate through flow bores in the capsule wall or in form of an annular slot.

The inventive concept provides this annular slot in a cross sectional range, whereby the required opening cross section provides a large radial width, so that convenient tolerances are provided when the valve is made. This in turn permits exact measurements when making the valves. The exact measurements of the valves are absolutely necessary to obtain an exact functioning of the decrease in the membrane capsule. Therefore, even if these valves are made on an assembly line, the functioning capability of the valves is assured.

In one embodiment of the inventive structure, the throttle inlet opening of the membrane capsule is in the form of an annular slot. This is advantageous since no special throttle openings have to be constructed, a feature which simplifies the manufacture of the valves. The required throttle cross sections which are defined by the annular width and annular cross section are so large that manufacturing tolerances do not have any influence on the throttle effect. Therefore, in an assembly type of manufacture for the valves, no manufacturing difficulties occur.

In a further embodiment of the valve, separate throttle bores are advantageous and permit exceptionally large manufacturing tolerances.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention.

Figure 2:
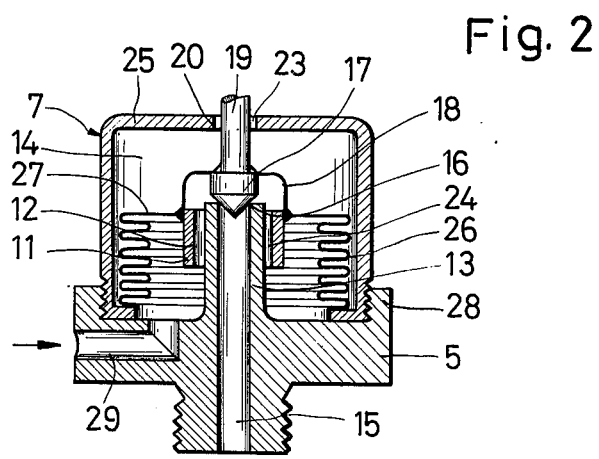

In the drawings, wherein similar reference numerals denote similar elements throughout the several views:

FIG. 1 is a partial cross-sectional view of a float controlled valve according to the invention; and FIG. 2 shows another embodiment of the control unit which cooperates with the valve of FIG. 1.

Referring to FIG. 1, there is shown in section a valve housing 1 with an associated inlet channel 2 and a discharge channel or outlet 3. A valve seat element 5 is provided within the inner chamber 4 of housing 1. The valve seat housing is provided with a plurality of axial supporting arms 6 at its outer surface and at the upper free ends of these supporting arms is mounted a membrane capsule 7.

Membrane capsule 7 is composed of an upper rigid wall portion 8 associated with a bellows element 9, and a stroke movable wall portion 10 which forms the bottom of bellows element 9. Wall portion 10 supports a central bushing 11 having a bore 12. An inlet nozzle 13 is mounted on valve seat element 5, and extends into the capsule inner chamber 14.

Inlet nozzle 13 is provided with a central through flow bore 15 which is communicative with discharge channel 3. Inlet nozzle 13 is provided at its capsule inner end with a valve seat 16, cooperating with a locking element 17 which is also mounted in inner chamber 14 of capsule 7. Locking element 17 is mechanically connected by means of a yoke 18 with the stroke movable wall portion 10, and is also provided with an actuating spindle 19 which extends through a bore 20 in capsule wall 8 of membrane capsule 7. At its upper end, actuating spindle 19 is coupled with a pivot lever arm 21 of a floating element 22 which is shown is section outside of the floating element.

The flow of the medium from inlet channel 2 to outlet channel 3 passes through an annular throttle slot 23, and parallel with respect to and between supporting arms 6, as well as through an annular throttle slot 24 into inner chamber 14 of membrane capsule 7, and from there through the nozzle flow bore 15 into discharge channel 3. When the system is at its rest position, such as when locking element 17 is in its locked position, stroke movable portion 10 which is connected to membrane capsule 7 is fed with the same pressure on both sides. When locking element 17 is lifted from valve seat 16 by float element 22 so that the medium starts to flow, the pressure in inner chamber 14 of the capsule decreases below the pressure of inner chamber 4, since the flowing medium undergoes a reduction in pressure in annular throttle slots 23 and 24. Thus, movable wall portion 10 is not evenly fed by pressure at both sides, so that a force is created in direction of the valve opening. This force is transmitted to movable wall portion 10 and across yoke 18 onto locking element 17 assisting the opening forces of float element 22, so that an additional opening force is present which effects a rapid opening of locking element 17.

When the medium level is lowered in valve housing 1, the valve first closes slowly corresponding to the lowering of the medium level until at the last moment of the locking stroke, the pressure in inner chamber 14 of the capsule increases due to the reduced flow of medium, so that the force fed to the wall portion 10 increases. Therefore, the locking forces increase on locking element 17 and overcome the opening force of float element 22, so that the locking element rapidly closes.

The embodiment in FIG. 2 shows a different structure than shown in FIG. 1. A rigid wall portion 25 of membrane capsule 7 is in the shape of a bell, and a bellowslike element 26 extends from below into wall portion 25. Thus, the bellows-type element 26 and the wall portion 25 are connected with each other at their lower ends, while the stroke movable wall portion 27 is arranged with axial distance between the two ends of wall portion 25. The mounting of the membrane capsule is done at a shoulder 28 of valve seat element 5. The valve seat element is provided with one of a plurality of channels 29 which permit the required flow of the medium to the lower side of wall portion 27 and to the annular throttle space 24. Otherwise, the operation of the valve is the same as described with respect to the embodiment of FIG. 1.

While only two embodiments of the present invention have been shown and described, it will be obvious to those skilled in the art that many changes and modifications may be made thereto without departing from the spirit and scope thereof.

What is claimed is:

1. A float controllable valve responsive to the level of fluid comprising:
    a housing having an internal chamber including an input supply opening and a discharge opening;
    a membrane capsule disposed in the interior of said housing and formed with at least a first throttle inlet bore communicative to the interior of said membrane capsule with the internal chamber of said housing at a pressure side, said membrane capsule including a rigid inlet nozzle extending into the interior of said membrane capsule and having a nozzle bore communicating with said discharge opening, said inlet nozzle having a valve seat in the interior of said membrane capsule between the throttle bore and the nozzle bore;
    a locking member slidably disposed and extending into the interior of said membrane capsule and having one end in sealing contact with said valve seat;
    a pivotable lever arm having a float secured at one end and disposed outside of said membrane capsule and having its opposite end pivotably coupled to said housing, said lever arm being pivotable coupled to the opposite end of said locking member; and
    a movable wall portion formed with a second throttle bore through which said rigid inlet nozzle extends, said wall portion being longitudinal moveable with respect to said nozzle and connected to said locking member and membrane capsule, so that when the fluid contacts the float and lifts the locking member from the valve seat, a pressure differential is created on both sides of the movable wall portion so that an additional opening force is exerted on said locking member.

2. The valve according to claim 1 wherein said membrane capsule includes a membrane comprising a bellows type element connected to said movable wall.

3. The valve in accordance with claim 1 wherein said first throttle inlet bore is defined by an opening formed on a wall of said membrane capsule opposite said valve seat and penetrated by said locking member.

4. The valve according to claim 1 wherein said throttle bores are radial annular slots disposed between the movable wall portion which is penetrated by said inlet nozzle, and between the wall of said membrane capsule penetrated by said locking element.

5. The valve according to claim 1 wherein a seal is provided between said movable wall portion and said inlet nozzle, and between the wall of said membrane capsule which is penetrated by said locking member.

6. The valve according to claim 2 wherein said bellows type element is pretensioned so that a displacement force in the locking direction is exerted onto said locking member.

* * * * *